United States Patent [19]

Hayashi et al.

[11] Patent Number: 4,918,867
[45] Date of Patent: Apr. 24, 1990

[54] OPENING TRIM

[75] Inventors: Keizo Hayashi, Nagoya; Masahiro Nozaki, Aichi, both of Japan

[73] Assignee: Toyoda Gosei Co., Ltd., Nishikasugai, Japan

[21] Appl. No.: 312,946

[22] Filed: Feb. 21, 1989

[30] Foreign Application Priority Data

Apr. 14, 1988 [JP] Japan .................. 63-050388[U]

[51] Int. Cl.⁵ .................................. E06B 7/16
[52] U.S. Cl. ...................... 49/490; 49/491; 49/497
[58] Field of Search .............. 49/497, 496, 490, 491; 52/716–718

[56] References Cited

U.S. PATENT DOCUMENTS 4,513,044  4/1985  Shigeki et al. .
4,531,326  7/1985  Ballocca et al. .
4,690,412  9/1987  Tuckley et al. .................. 49/490 X
4,745,016  5/1988  Hashimoto et al. .............. 49/497 X
4,787,668  11/1988  Kawase et al. .

Primary Examiner—Philip C. Kannan
Attorney, Agent, or Firm—Cushman, Darby & Cushman

[57] ABSTRACT

An opening trim which is mounted to a body flange of a door mounting opening portion of an automobile, and provided with a U-like cross-section and grasping lips on the inside of the U-like cross-section. The opening trim comprises a portion intended to grasp a thick portion of the body flange and a usual portion continuing to the portion intended to grasp the thick portion, and both portions are molded integrally by means of extrusion molding. The inclination angle of the grasping lips at least in one side of the portion intended to grasp the thick portion with respect to the flange inserting surface is made smaller than that in the usual portion. Thereby the flange pushing resisting force in the portion intended to grasp the thick portion is about equal with that in the usual portion.

3 Claims, 3 Drawing Sheets

OPENING TRIM

BACKGROUND OF THE INVENTION

1. Field of the Invention

The present invention relates to an opening trim which is mounted to a body flange of a door mounting opening portion of an automobile so as to hide the body flange. More particularly, the invention is favorable in the case that thickness of composite sheets of the body flange has significant difference between a usual portion and a thick portion.

2. Description of the Prior Art

A door weather strip as shown in FIG. 1 will be described as an example of the prior art where an opening trim, i.e., a trim portion 1 is integrated with a hollow seal portion 3.

In this case, the trim portion 1 is formed by solid rubber, and is provided with an insert 5 embedded therein and also with grasping lips 7, 8 in plural pieces (two pairs in the figure) to grasp a body flange 21. The hollow seal portion 3 is generally formed by sponge rubber. Ethylene propylene rubbers, chloroprene rubbers or the like are used usually as a rubber material.

In a weather strip as above described, it has been studied from the benefit of productivity that a corner forming portion is molded integrally by means of extrusion molding with a straight forming portion (refer to the Japanese patent application laid-open No. 59-171735).

In this case, the grasping lips 7, 8 at the inside of the U-like cross-section and the inclination angle $\alpha$ with respect to the flange inserting surface 1 are made about equal throughout the whole axial direction.

On the other hand, in the body flange 21 in the door mounting opening portion, for example, a junction portion (hereinafter referred to as "T-like junction portion") T between a center pillar 23 and a roof side rail 25 as shown in FIG. 2 is constituted mainly from the purpose of intensity improvement by a combination of three to four metal sheets as shown in FIG. 3, and the thickness of the composite sheets becomes larger than that of the other portion and a thick portion 21a is formed.

Consequently, in order that the weather strip is mounted by fitting the trim portion 1 to the body flange 21, the fitting resistance of the trim portion 1 in the thick portion 21a of the T-like junction portion becomes significantly large in comparison to the other portion (the usual portion) thereby the mounting workability is not good.

If the inclination angle $\alpha$ of the grasping lips 7, 8 with respect to the flange inserting surface 1 is made gentle throughout the whole cross-section, that is, if the grasping lips 7, 8 are laid down wholly along the flange inserting surface 1, the fitting workability can be improved but the grasping force (fitting force) of the grasping lips 7, 8 is wholly decreased and not desirable.

SUMMARY OF THE INVENTION

An object of an opening trim of the invention is to solve the above-mentioned problems by the following construction.

An opening trim which is mounted to a body flange of a door mounting opening portion of an automobile, comprising U-like cross-section, and grasping lips on the inside of the U-like cross-section, wherein a portion intended to grasp a thick portion of the body flange is molded integrally by means of with the other portion continuing to the grasping intended portion, characterized in that inclination angle of the grasping lips with respect to the flange inserting surface at least in one side of the portion intended to grasp the thick portion is made smaller than that in the other portion.

When the opening trim is fitted to the T-like junction portion by the above-mentioned constitution, since the portion intended to grasp the thick portion has the grasping lips laid down previously along the flange inserting surface, the pushing resisting force during the fitting is about equal with that in the usual portion (the other portion). Consequently, the fitting workability of the opening trim to the opening trim is improved. Since the inclination angle of the grasping lips in the other portion with respect to the flange inserting surface is as usual, the body flange holding force in the usual portion is not varied.

DESCRIPTION OF THE PREFERRED EMBODIMENT

Figure 1:
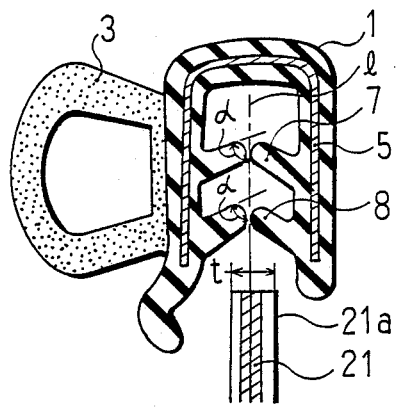
FIG. 1 is a sectional view partly cutaway of a weather strip in the prior art.
Figure 2:
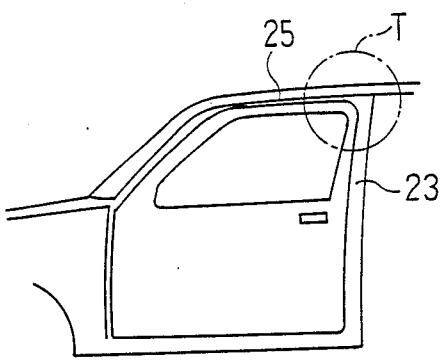
FIG. 2 is a fragmentary side view of an automobile illustrating T-like junction portion in FIG. 3.
Figure 3:
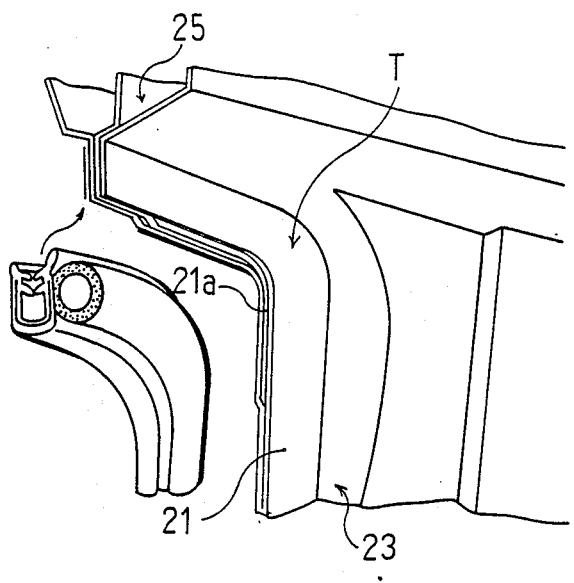
FIG. 3 is a perspective view illustrating the T-like junction portion between a center pillar and a roof side rail before assembling a weather strip.

An embodiment of the invention will now be described referring to the accompanying drawings. The same parts as those in the prior art are designated by the same reference numerals, and the description shall be partially omitted.

Figure 4:
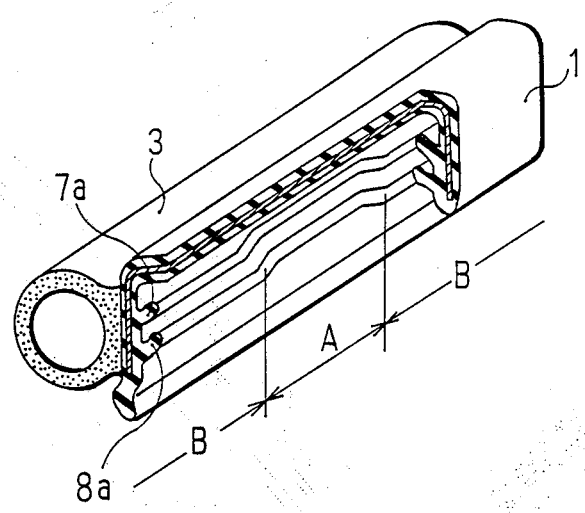
FIG. 4 is a perspective view partly cutaway of a weather strip to which the invention is applied.
Figure 5:
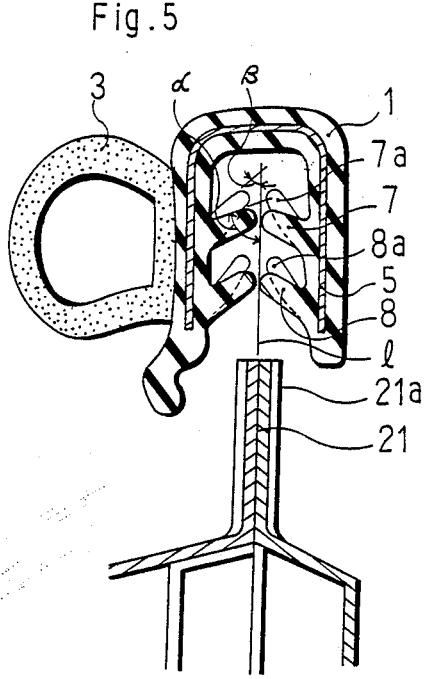
FIG. 5 is a sectional view illustrating the state immediately before fitting to a flange to which the invention is applied.
Figure 7:
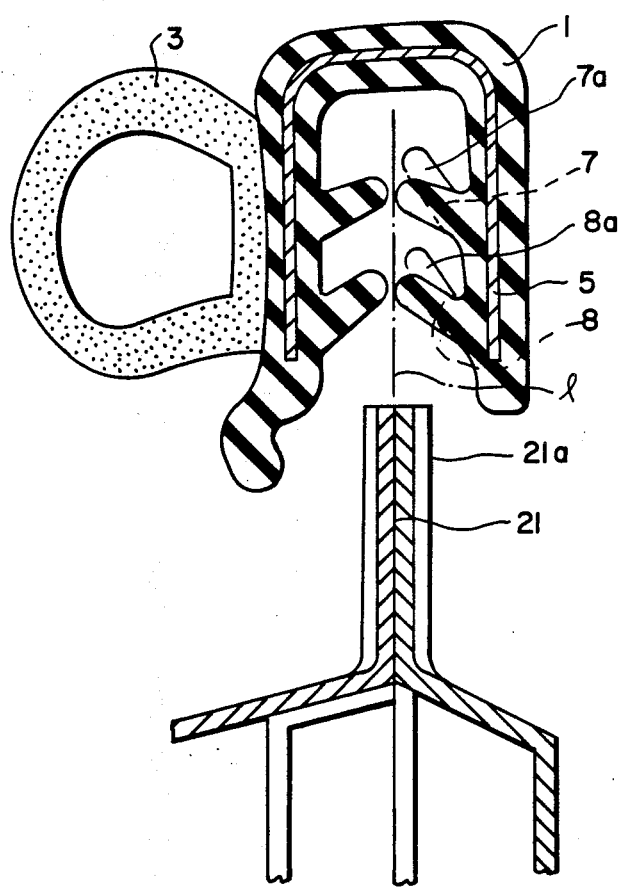
FIG. 7 is a sectional view illustrating an alternate state immediately before fitting into a flange to which the invention is applied.

As shown in FIGS. 4 to 5, in a portion A intended to grasp a thick portion 21a of a body flange 21, the inclination angle $\eta$ of its grasping lips 7a, 8a with respect to the flange inserting surface 1 is made more gentle than the inclination angle $\alpha$ in the usual portion. That is, the inclination angle of the grasping lips 7a, 8a in the portion A intended to grasp the thick portion with respect to the flange inserting surface 1 is laid down in comparison to that in the other portion. For example, when $\alpha=70°$, $\beta=60°$. As shown in FIG. 7, the inclination angle of the grasping lip on one side of the portion intended to grasp the thick portion with respect to the flange inserting surface is made smaller than that in the usual portion.

In this embodiment, the position to grasp the T-like junction portion T between the center pillar 23 and the roof side rail 25 is the portion A intended to grasp the think portion.

The partial variation of the inclination angle of the grasping lips 7, 8 is preferably formed between the weather strip extrusion process and the curing process.

Figure 6:
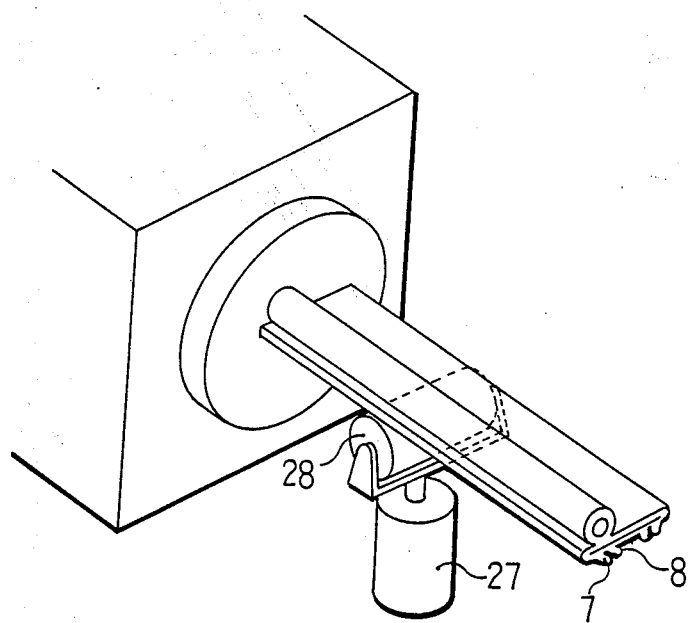
FIG. 6 is a perspective view illustrating an example of manufacturing method of the weather strip to which the invention is applied.

As shown in FIG. 6, a shaping roll 28 moving up and down by an air cylinder 27 is arranged immediately before an extrusion head 29 and projected intermittently thereby the partial variation of the inclination angle is formed.

The weather strip in the embodiment is fitted to the body flange 21 of the door opening portion in the similar manner of the prior art. When the weather strip is fitted to the thick portion 21a of the T-like junction portion T, since the portion A intended to grasp the thick portion 21a has the grasping lips 7a, 8a laid down previously along the flange inserting surface 1, the pushing resisting force during the fitting is about equal with that in the usual portion (the other portion) B.

In the above description, although the inclination angles of the grasping lips are made equal in the lateral direction and the vertical direction for convenience of the description, these angles may be slightly different. Further, the invention can be applied also to the case that the grasping lip in one side is long and the grasping lip in the other side is short (In this case, the inclination angle of only the longer grasping lip is varied from that in other portion) or to the opening trim where the opposite surfaces do not constitute a pair to each other, for example, that constituted by one piece at one side and two pieces at the other side.

What is claimed is:

1. An opening trim which is mounted to a body flange of a door mounting opening portion of an automobile, and provided with a U-like cross-section and grasping lips on the inside of the U-like cross-section, comprising:
   (a) a portion intended to grasp a thick portion of the body flange and a usual portion continuing to the portion intended to grasp the thick portion;
   (b) said portion intended to grasp the thick portion and said usual portion being molded integrally by means of extrusion molding; and
   (c) the inclination angle of the grasping lips at least in one side of said portion intended to grasp the thick portion with respect to the flange inserting surface being made smaller than that in said usual portion.

2. An opening trim as set forth in claim 1, wherein the inclination angle of the grasping lips on both sides of said portion intended to grasp the thick portion with respect to the flange inserting surface is made smaller than that in said usual portion.

3. An opening trim as set forth in claim 1, wherein the inclination angle of the grasping lip on one side of said portion intended to grasp the thick portion with respect to the flange inserting surface is made smaller than that in said usual portion.

* * * * *